United States Patent
Erlinger

(10) Patent No.: US 10,131,387 B2
(45) Date of Patent: Nov. 20, 2018

(54) CONSTRUCTION VEHICLE HAVING A TIPPABLE CHASSIS

(71) Applicant: Wacker Neuson Linz GmbH, Hoersching (AT)

(72) Inventor: Thomas Erlinger, Herzogsdorf (AT)

(73) Assignee: Wacker Neusen Linz GmbH, Hoersching (AT)

( * ) Notice: Subject to any disclaimer, the term of this patent is extended or adjusted under 35 U.S.C. 154(b) by 0 days.

(21) Appl. No.: 15/173,694

(22) Filed: Jun. 5, 2016

(65) Prior Publication Data

US 2016/0362149 A1 Dec. 15, 2016

(30) Foreign Application Priority Data

Jun. 9, 2015 (DE) .......... 10 2015 109 112

(51) Int. Cl.
| | |
|---|---|
| *B62D 55/116* | (2006.01) |
| *E02F 9/12* | (2006.01) |
| *E02F 9/02* | (2006.01) |
| *E02F 9/22* | (2006.01) |
| *B60B 35/10* | (2006.01) |
| *B62D 55/084* | (2006.01) |

(Continued)

(52) U.S. Cl.
CPC .......... *B62D 55/116* (2013.01); *B60B 35/10* (2013.01); *B60B 35/1054* (2013.01); *B60G 1/04* (2013.01); *B60G 9/02* (2013.01); *B60G 21/007* (2013.01); *B60G 99/00* (2013.01); *B62D 55/084* (2013.01); *E02F 3/7609* (2013.01); *E02F 9/024* (2013.01); *E02F 9/028* (2013.01); *E02F 9/12* (2013.01); *E02F 9/2257* (2013.01); *B60B 35/1045* (2013.01)

(58) Field of Classification Search
CPC .... B62D 55/116; B62D 55/084; B62D 55/00; B62D 55/075; B60G 1/04; B60G 21/007; B60G 2300/09; E02F 9/028; E02F 9/024; E02F 9/12; E02F 9/2257; E02F 9/02; B60B 35/10; B60B 35/1036; B60B 35/1045; B60B 35/1054; B60B 35/1063; E21B 7/024
USPC ....................................... 280/6.154
See application file for complete search history.

(56) References Cited

U.S. PATENT DOCUMENTS

| | | | |
|---|---|---|---|
| 5,113,825 A * | 5/1992 | Takahashi ........... | B60K 26/00 123/365 |
| 2008/0087468 A1 | 4/2008 | Law et al. | |
| 2013/0030661 A1* | 1/2013 | Opperman ........... | B25J 5/005 701/50 |

FOREIGN PATENT DOCUMENTS

| | | |
|---|---|---|
| AT | 006798 U1 | 4/2004 |
| CN | 102367058 A * | 3/2012 |

(Continued)

OTHER PUBLICATIONS

Search Report From EP 16 16 9548, dated Oct. 5, 2016.

*Primary Examiner* — Keith J Frisby
(74) *Attorney, Agent, or Firm* — HDC Intellectual Property Law, LLC

(57) ABSTRACT

A construction vehicle has a slewing ring on which a superstructure is rotatably mounted, and an undercarriage supporting the slewing ring. The undercarriage includes an upper chassis, having an upper propulsion device, that is rigidly connected to the slewing ring, and a lower chassis having a lower propulsion device that is mounted in a pivotable manner with respect to the upper chassis. Furthermore, a pivoting apparatus is provided in order to pivot the lower chassis relative to the upper chassis.

20 Claims, 9 Drawing Sheets

(51) Int. Cl.
*B60G 1/04* (2006.01)
*B60G 9/02* (2006.01)
*B60G 21/00* (2006.01)
*B60G 99/00* (2010.01)
*E02F 3/76* (2006.01)

(56) References Cited

FOREIGN PATENT DOCUMENTS

| CN | 102367058 B | 6/2014 |
|---|---|---|
| DE | 1949782 | 9/1970 |
| DE | 1949782 A1 | 9/1970 |
| DE | 3230659 A1 | 6/1984 |
| DE | 202004004934 U1 | 9/2004 |
| JP | H0880879 A | 3/1996 |
| JP | H11208538 A | 8/1999 |
| KR | 101252098 B1 | 4/2013 |
| WO | 2010028649 A1 | 3/2010 |

\* cited by examiner

CONSTRUCTION VEHICLE HAVING A TIPPABLE CHASSIS

BACKGROUND OF THE INVENTION

1. Field of the Invention

The invention relates to a construction vehicle, for example excavator.

2. Description of the Related Art

Construction vehicles, in particular excavators, are known, in which a structure, for example a superstructure, is mounted on a slewing ring so as to be rotatable about a vertical axis. The superstructure usually has a tool manipulator for any desired tools, for example buckets, chisels etc. The vertical axis can be tipped relative to a footprint of the construction vehicle. To this end, the slewing ring is held by an undercarriage having two tracked suspensions and can be tipped relative to the tracked suspensions.

Since, in such construction vehicles, a tipped position of the superstructure relative to the chassis is possible, it is possible to use these construction vehicles to dig vertically downward for example even on steep terrain, this entailing the advantage, compared with other construction vehicles, that only relatively small amounts of material have to be excavated, making it possible to save time and material. In addition, the stability of the construction vehicle on a slope is increased. Moreover, the construction vehicle operator is always located in his customary horizontal sitting position while working, this also significantly increasing work safety.

AT 11 088 U1 discloses such a construction vehicle, having an undercarriage supporting a slewing plate, wherein a structure, or superstructure, is rotatably mounted on the undercarriage, and wherein, for the tipped position of the structure relative to the undercarriage, the slewing plate is mounted so as to be pivotably adjustable about an axle on the undercarriage.

WO 2010/028649 A1 discloses another construction machine, which does not have an undercarriage, however, but individual arms which can be moved individually and adapted to the particular terrain in order to allow the vertical axis of the superstructure to be oriented vertically.

Of particular importance in such construction vehicles is the fact that they stand safely even on steep terrain and in particular a risk of tipping when the vertical axis is pivoted is minimized.

SUMMARY OF THE INVENTION

The invention is based on the object of specifying a construction vehicle having a chassis that is tippable relative to its structure, or the superstructure, said chassis allowing further improvement in stability.

The object is achieved according to the invention by a construction vehicle that has a slewing ring on which a structure, or a superstructure, is rotatably mounted, and an undercarriage supposing the slewing ring. The undercarriage has both an upper chassis having an upper propulsion device that is rigidly connected to the slewing ring, and a lower chassis having a lower propulsion device that is mounted in a pivotable manner with respect to the upper chassis. Furthermore, a pivoting apparatus is provided in order to pivot the lower chassis relative to the upper chassis.

The designations "lower chassis" and "upper chassis" serve at this point primarily to differentiate the two chassis components. The terms were selected in order to clarify which chassis is rigidly connected to the slewing ring (the upper chassis) and which chassis can be pivoted relative thereto, in particular can be pivoted downward with respect to a horizontal plane (the lower chassis). Another designation could have been selected just as easily, for example "first chassis" and "second chassis", although this would have been less helpful for illustrating the invention.

The undercarriage thus includes a divided undercarriage frame which has the two chassis.

The upper chassis is rigidly connected to the slewing ring and therefore supports the slewing ring. The rigid connection means in particular that the slewing ring is not pivotable or tippable relative to the upper chassis. The slewing ring defines the vertical axis about which she structure, or the superstructure, can be rotated. Therefore, by appropriate orientation of the upper chassis, the vertical axis has to be able to extend in the vertical direction. Rigid thus also means in particular that the relative position between the slewing ring and the upper chassis is not intended to be changeable.

The propulsion device can be for example in each case a tracked suspension or a wheeled suspension.

With the aid of the pivoting apparatus, it is possible to set the relative pivoted position between the lower chassis and the upper chassis. In particular, pivoting is possible between a horizontal position, in which the two propulsion device are located in a common horizontal plane parallel to a rotary plane of the superstructure and thus perpendicularly to the vertical axis of the slewing ring, and any desired inclined position, which is appropriate in particular on hills. The pivot angle can be for example between 0° (horizontal position) and 60°.

By pivoting only the lower chassis, while the upper chassis is connected rigidly to the slewing ring, it is possible inter alia for the valley-side track guide, that is to say the lower propulsion device, to be virtually parallel to the underlying surface. It is precisely the lower propulsion device that is particularly loaded, which can result in frequent track failure under high load. As a result of the parallel orientation of the lower propulsion device with respect to the underlying surface, however, the load is reduced, and so the service life can be increased.

Overall as a result of the division of the undercarriage into two parts, improved stability can be achieved especially on steep terrain.

At least one pivot axle, about which the lower chassis is pivotable relative to the upper chassis, can be formed between the upper chassis and the lower chassis. In this case, the pivoting apparatus can have a hydraulic and/or electrical actuating device. The actuating device cart in particular be longitudinally adjustable and thus change the distance between the lower chassis and the upper chassis at a particular point. As a result pivoting about the pivot axle is possible, such that an angular adjustment can be achieved between the two chassis, if appropriate, it is also possible to provide a plurality of pivot axles about which the lower chassis is pivotable relative to the upper chassis.

Suitable as the actuating device are for example a differential cylinder, a hydraulic piston-cylinder unit, an electrically or hydraulically operated spindle unit or some other linear adjustment means that is known per se.

A dozer blade can be fastened to the lower chassis. With the aid of the dozer blade, it is possible to clear the route in front of the construction vehicle, this being advantageous in particular on difficult terrain. Since the dozer blade is pivoted together with the lower chassis, the position of the dozer blade also automatically adapts if appropriate to inclined positions on the terrain.

In one embodiment the lower propulsion device can be movable linearly relative to the pivot axle. This means that, the lower propulsion device can be shifted away from the pivot axle and toward the pivot axle.

Thus, in addition to the actual pivoting movement of the lower propulsion device (together with the lower chassis) about the pivot axle, a radial movement linearly relative to the pivot axle is also possible. In this way, it is also possible to change the distance of the lower propulsion device from the pivot axle and thus from the upper chassis, which is not movable relative to the pivot axle. By increasing the distance, it is also possible for the footprint of the construction vehicle on the two propulsion device to be increased or reduced in size depending on the intended purpose.

In particular, the lower chassis can have a telescoping device which is configured to change the distance between the lower propulsion device and the pivot axle. The telescoping device thus provides means with which the distance can be set depending on the retirements of the driver of the construction vehicle. However, it is also possible for the telescoping device to automatically change the distance depending on the angular position or pivoted position of the lower propulsion device and thus of the lower chassis relative to the upper chassis. For example, the distance of the lower propulsion device from the pivot, axle can be increased as the lower chassis pivots more. In this way, a reduction in size of the effective footprint (footprint projected onto a horizontal plane) can be counteracted, but rather, this footprint can be kept constant or even increased in size.

Without such telescoping, that is to say an increase in the footprint, the effective footprint (projected footprint) would become smaller as the lower chassis pivots more.

A coupling device can be provided between the upper chassis and the lower chassis in order to automatically change the distance between the lower propulsion device and the pivot axle when the lower chassis is pivoted relative to the upper chassis. Thus, together with the two chassis, the coupling device brings about a mechanical linkage. The more the lower chassis is pivoted relative to the upper chassis, the greater the distance can be set. In this case, the telescoping device has not only means for linearly displacing the lower chassis in an appropriately stable manner relative to the pivot axle, but also the coupling device.

The coupling device can have a coupling rod, one end of which is pivotably fastened to the upper chassis and the other end of which is pivotably fastened to the lower chassis. As a result, the coupling, rod imposes a movement on the lower chassis when the lower chassis is pivoted relative to the upper chassis. However, to this end, it is necessary for the lower chassis to be configured in a suitable manner and in particular for its linear length, that is to say the distance between the lower propulsion device and the pivot axle to be able to be changed.

The telescoping device can have an upper telescopic element that is coupled to the pivot axle and is pivotable about the pivot axle, and a lower telescopic element that is coupled rigidly to the lower propulsion device, wherein the telescopic elements are guided one inside the other and are movable linearly relative to one another. Here, too, what was stated above also applies with regard to the choice of the terms "lower telescopic element" and "upper telescopic element", these terms therefore merely having been selected for better differentiation and understandability.

Accordingly, the two telescopic elements can—in the style of a telescope—be guided one inside the other and extend linearly in the longitudinal direction, wherein the linear relative position is changeable.

Depending on the configuration, it is possible for telescoping, that is to say effecting a change hi the distance of the lower propulsion device from the pivot axle and thus a change in the radial length of the lower chassis, to be possible without the two chassis having to be pivoted relative to one another. Thus, even in the horizontal position, in which the lower chassis is not pivoted, an increase in the distance can be brought about in order to increase the size of the footprint defined by the distance between the two propulsion device.

If the abovementioned coupling rod is present, the other end of the coupling rod can be pivotably fastened to the lower telescopic element while the one end is pivotably fastened to the upper chassis. As a result, when the lower chassis is pivoted, the lower telescopic element can be extended relative to the upper telescopic element and the distance from the pivot axle increased.

The telescoping device can have a telescope actuating device for changing the relative position of the two telescopic elements with respect to one another. The telescope actuating device can—in a similar manner to the abovementioned electrical actuating device of the pivoting apparatus—be a hydraulic piston-cylinder unit or an electrically operated linear drive, for example a spindle drive etc.

The telescope actuating device can be arranged inside at least one of the telescopic elements. In this case, this telescopic element (or even both telescopic elements) serve(s) to protect the telescope actuating device, for example, a hydraulic cylinder can be arranged in a protected manner in a strut formed by the two telescopic elements.

A stop can be provided between the lower chassis and the upper chassis in order to define a horizontal operating state in which the chassis take up a relative position in which the propulsion device are in a common horizontal plane. The stop thus defines an end position, namely the horizontal position, which serves as an initial state for other positions into which the lower chassis is pivoted. The stop can be formed for example by a strut interconnection which also serves to stabilize the structure of the entire undercarriage, or of the lower chassis. In a similar way, a further stop can also be provided which delimits the extreme position, that is to say the pivoted position of the lower chassis at a maximum angle.

BRIEF DESCRIPTION OF THE DRAWINGS

This and further advantages and features of the invention are explained in more detail in the following text with reference to examples with the aid of the accompanying figures, in which.

DETAILED DESCRIPTION

In the following description of the figures, identical or functionally identical components are each designated with the same reference signs.

Figure 1:
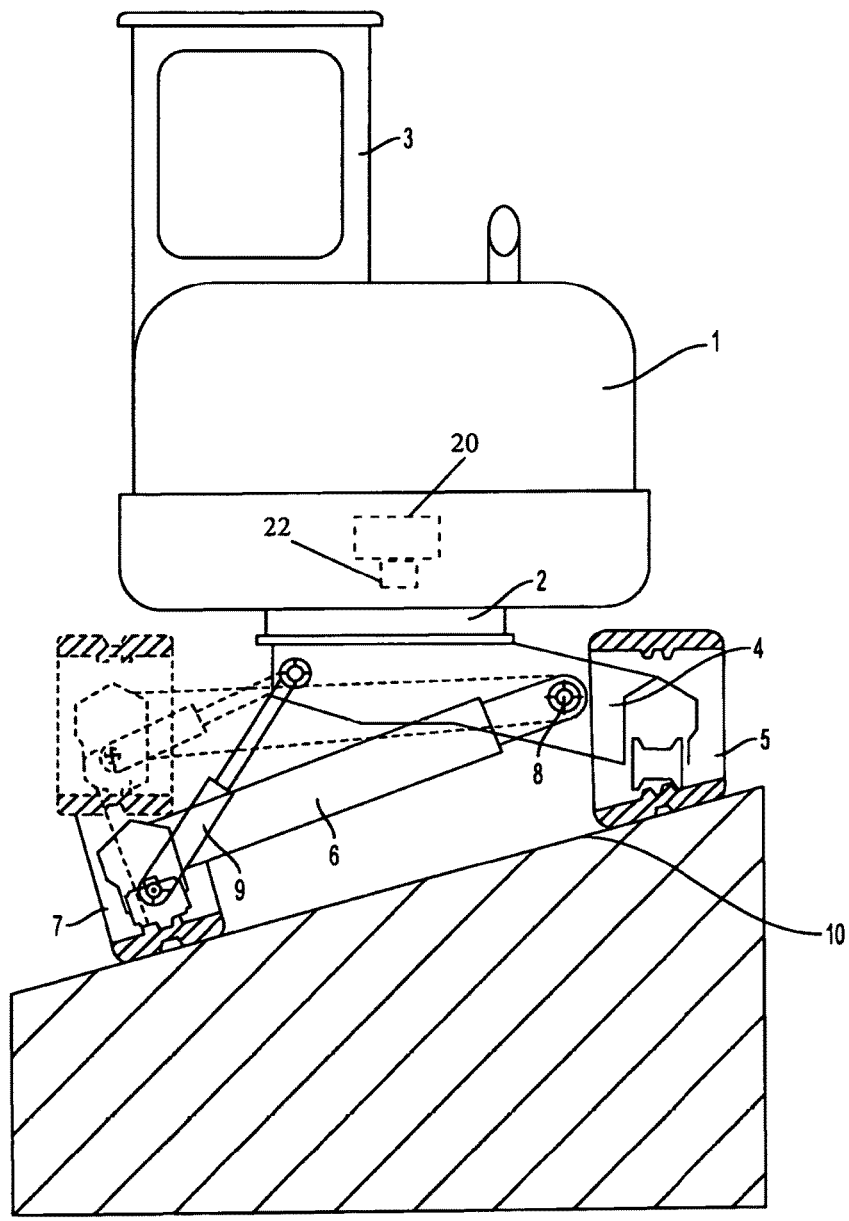
FIG. 1 shows a rear view of a construction vehicle.

FIG. 1 shows a rear view of a first embodiment of an excavator serving as a construction vehicle.

The excavator has a structure formed by a superstructure 1, which is rotatably mounted in a known manner on a slewing ring 2. In addition to a driver's cab 3, a tool manipulator 20 for any desired tool 22, for example a bucket, a chisel and the like, is provided on the superstructure 1.

The slewing ring 2 is rigidly connected to an upper chassis 4 and is supported by the latter. The upper chassis 4 has an upper propulsion device 5, in the present case a tracked suspension, which can likewise be constructed in a known manner. Furthermore, a lower chassis 6 is provided, at the end of which a lower propulsion device 7, for example likewise a tracked suspension, is arranged. As can be appreciated from FIGS. 1 and 2, the upper end of the lower chassis 6, located at the pivot axle 8, is located beneath the upper end of the upper chassis 4 when the vehicle is resting on level ground or even on a slope as illustrated. As a result, the upper end of the upper chassis 4 is necessarily located on a first side of a lateral bisector of the machine and the lower end of the upper chassis is located on a second side of the lateral bisector opposite the first side. Similarly, the upper end of the lower chassis 6 is located on the second side of the lateral bisector and the lower end of the lower chassis is located on the first side of the lateral bisector.

To this extent, the slewing ring 2 and the upper chassis 4 form a structural unit. In particular, the angular position of the slewing ring 2 relative to the upper chassis 4 is not changeable.

The lower chassis 6 is pivotable about a pivot axle 8 relative to the upper chassis 4. The pivot axle 8 is held by the upper chassis 4. It can be arranged in particular between the longitudinal axis, extending in the direction of travel of the upper propulsion device 5 and a longitudinal axis extending through the center of the slewing ring 2, as can also be seen in FIG. 1.

The pivoted position of the lower chassis 6 relative to the upper chassis 4 is maintained or changed with the aid of an actuating device 9 which, together with the pivot axle 8, forms a pivoting apparatus. The actuating device 9 is, in the example shown, a piston-cylinder unit with the aid of which the relative pivoted position can be set hydraulically.

The actuating device 9 can be articulated, in particular at its one end, to the lower chassis 6 in the region of the lower propulsion device 7 and, at its other end, to the upper chassis 4 in the region of the slewing ring 2. In this case, the fastening of the actuating device 9 to the lower chassis 6 can be located in a region which is surrounded by the track of the lower propulsion device 7, as can be seen in FIG. 1. The fastening of the other end of the actuating device 9 in the region of the slewing ring 2 can be located for example directly beneath the actual slewing ring 2, as shown in FIG. 1. Other fastening locations of the actuating device 9 are possible and depend essentially on the geometric conditions and configurations of the two chassis 4, 6.

FIG. 1 shows by way of example two different pivoted positions: firstly, dashed lines indicate a horizontal position in which the two propulsion device 5, 7 are in a common horizontal plane parallel to the rotary plane of the superstructure 1. The horizontal position thus corresponds to a conventional position for excavators.

Furthermore, FIG. 1 shows (by way of solid lines) a pivoted position in which the lower chassis 6 has tee a pivoted into an angular position relative to the upper chassis 5 with the aid of the actuating device 9. The pivoted position is appropriate when the excavator is standing on an inclined underlying surface, for example a slope, as shown in FIG. 1. If the lower chassis 6 were not pivotable, the entire excavator, together with the slewing ring 2 and the superstructure 1, would stand in an inclined position, and this would not only considerably limit the operational capability of the excavator but would also impair the driving comfort for the excavator operator.

However, with the aid of the pivotable lower chassis 6, the inclined position of the underlying surface 10 can be equalized, as FIG. 1 shows. In particular, the upper chassis 4 with the slewing ring 2 can be oriented such that the stewing ring 2 is located in a horizontal plane. Accordingly, the superstructure 1 is also in a horizontal plane and the rotary axis of the superstructure 1, and of the stewing ring 2, is oriented in a vertical direction.

In this case, it is also advantageous for the lower propulsion device 7 to be substantially parallel to the underlying surface 10, that is to say in particular the track of the lower propulsion device is not subjected to any particular deformation, as is clearly visibly the case for example for the track of the upper propulsion device 5. It is precisely the track of the lower propulsion device 7 that is particularly loaded in use, because a considerable part of the load is supported thereon, and as a result it has only a limited service life. However, as a result of the parallel position with respect to the underlying surface 10, the load can be reduced and thus the service life increased.

Figure 2:
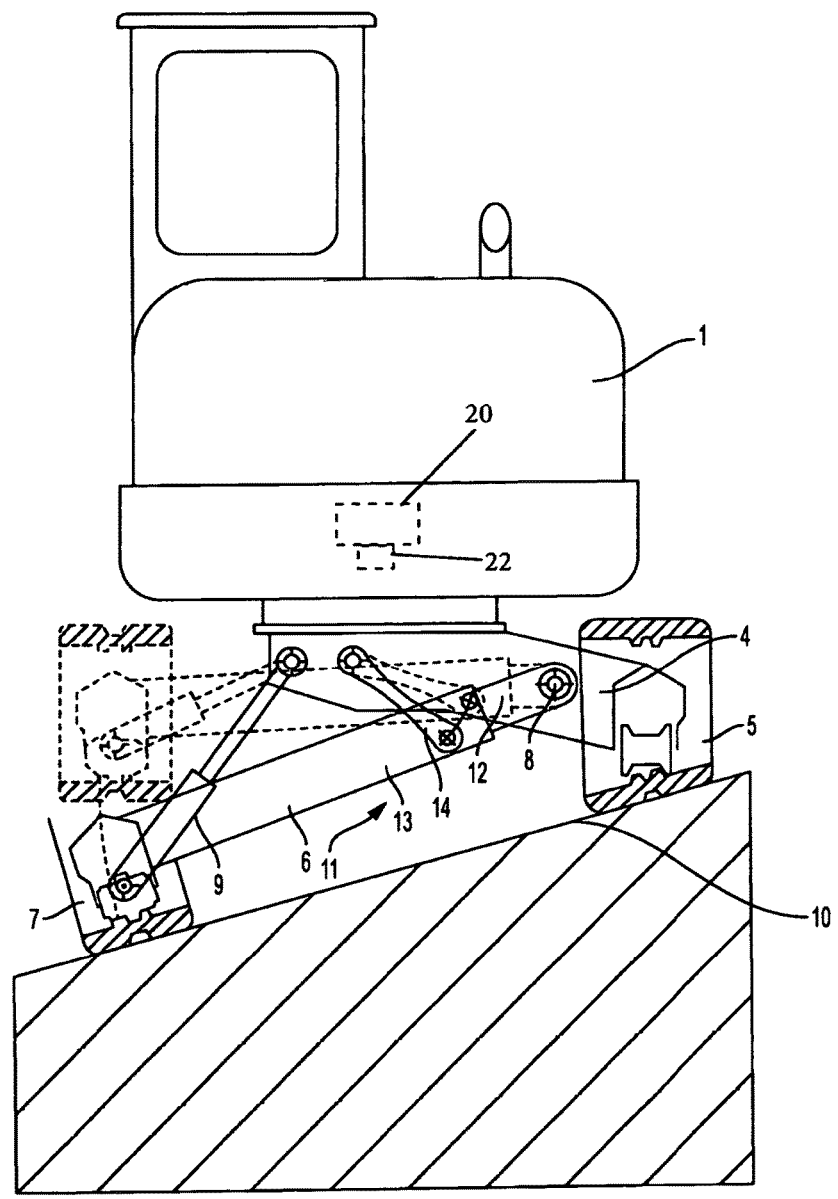
FIG. 2 shows another embodiment of the construction vehicle with a telescoping device.

FIG. 2 shows a variant of the excavator from FIG. 1 having a telescoping device 11.

The telescoping device 11 serves to make it possible to change the distance between the lower propulsion device 7 and the pivot axle 8. In particular, it is intended to be possible by way of the telescoping device 11 for the lower propulsion device 7 to be moved further away from the pivot axle 8 the more the lower chassis 6 is pivoted out of the horizontal position (dashed lines).

The telescoping device 11 has two struts that are displaceable one inside the other, namely an upper strut 12 that serves as the upper telescopic element and a lower strut 13 that serves as the lower telescopic element. The terms are selected analogously to the designations of the chassis and of the propulsion device and are intended to serve merely for better understanding. Thus, all designations with "upper" refer to the slope-side components, while "lower" is directed to the valley-side components. Designations such as "left-hand" and "right-hand" or "first" and "second" could just as easily have been selected. It is not the case that "upper" also means that the components have to be located at a higher level.

The struts 12, 13 are longitudinally displaceable relative to one another and form a part of the lower chassis 6.

One end of the upper strut 12 is pivotably coupled to the pivot axle 8. Its other end is guided in a linearly movable manner in the lower strut 13. The lower end of the lower strut 13 in turn supports the lower propulsion device 7.

The telescopic displacement movement is brought about by a coupling rod 14, one end of which is pivotably fastened to the upper chassis 4 and the other end of which is pivotably fastened to the lower chassis 6, in this case to the lower strut 13.

When the lower chassis 6 is pivoted relative to the upper chassis 4 with the aid of the actuating device 9, the coupling rod 14 imposes a displacement movement relative to the upper strut 12 on the lower strut 13. In particular, the lower strut 13 is moved away from the pivot axle 8 such that the distance between the lower propulsion device 7 and the pivot axle 8 is increased. This is discernible in particular by comparing the illustrations in FIGS. 1 and 2. The lower propulsion device 7 is clearly further to the left in FIG. 2 than it is in FIG. 1.

Telescoping thus has the effect that the distance between the two propulsion device 5, 7 is increased. As a result the overall footprint of the excavator on the underlying surface id is also increased in size, resulting in improved stability. In particular, the risk of the excavator tipping in the valley direction, can be considerably reduced.

FIGS. 3 to 6 show another embodiment, in which, however, the basic principles of the embodiment in FIG. 2 are adopted. Therefore, the reference signs are also retained. However, the figures show only the substructure with the undercarriage consisting of the chassis 4 and 6, and the slewing ring 2.

Figure 3:
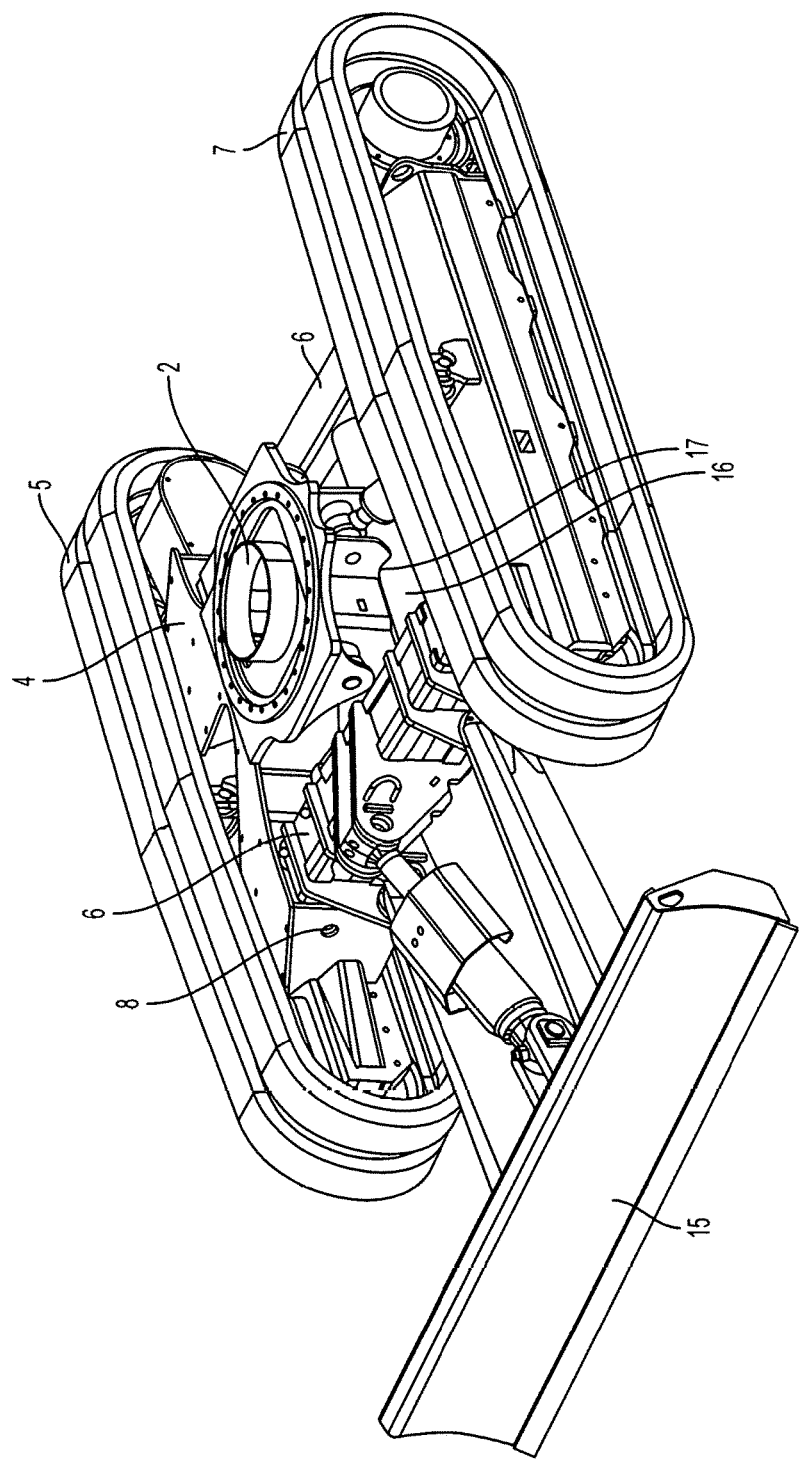
FIG. 3 shows a perspective view of the substructure of a construction vehicle.
Figure 4:
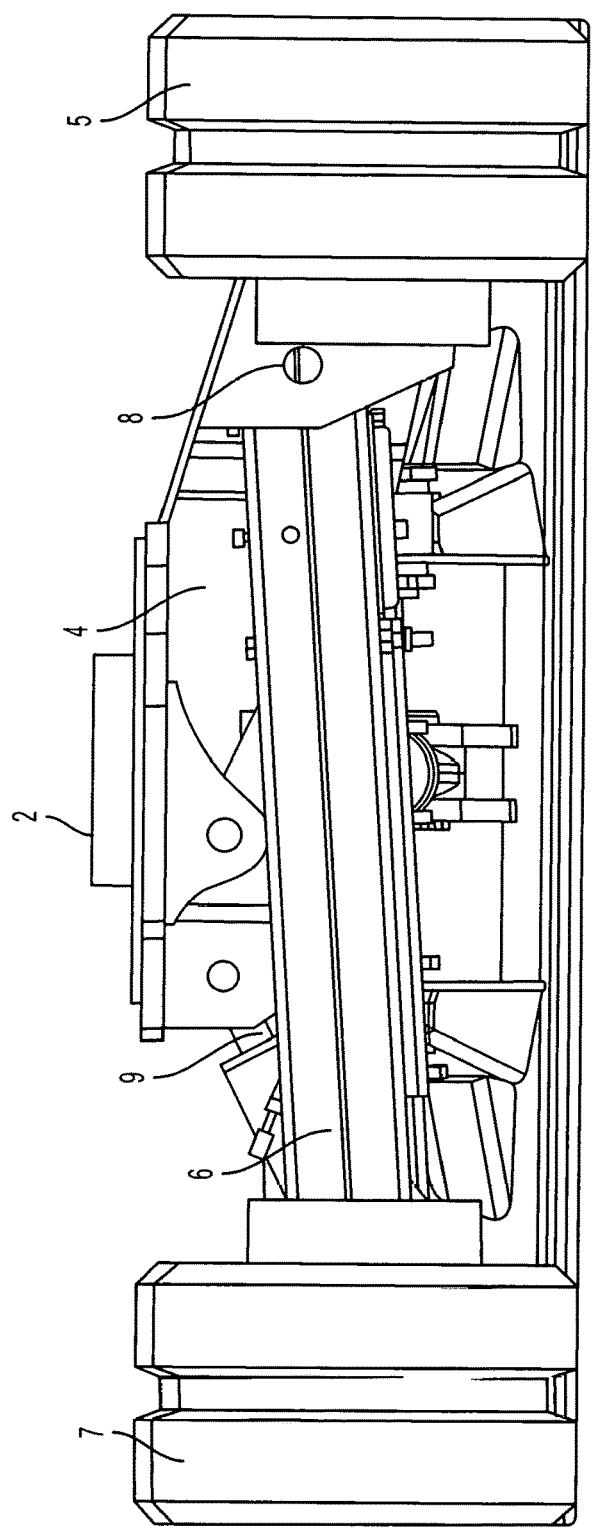
FIG. 4 shows a rear view of the structure from FIG. 3.
Figure 5:
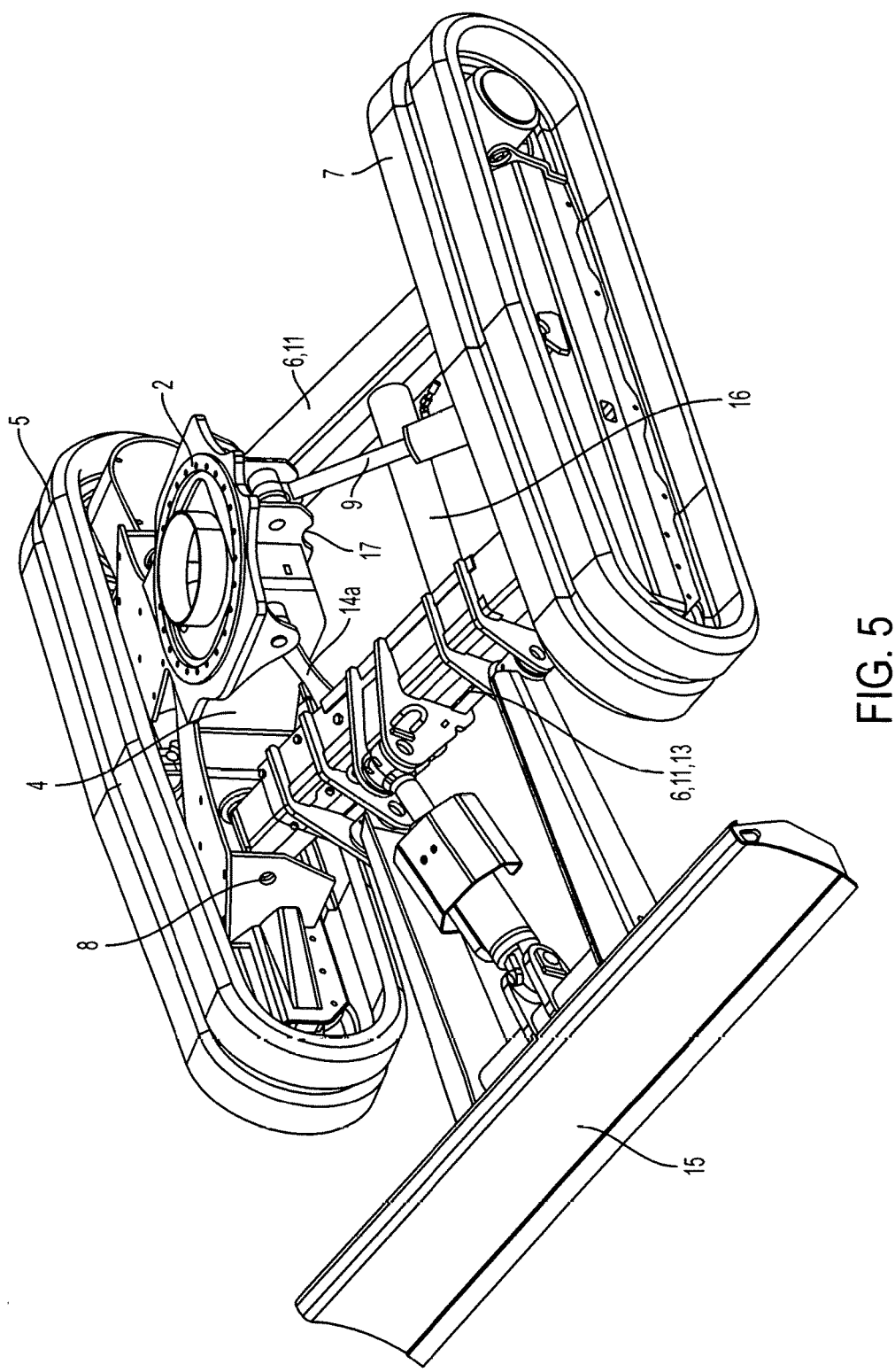
FIG. 5 shows the construction vehicle from FIG. 3 with the lower chassis pivoted.
Figure 6:
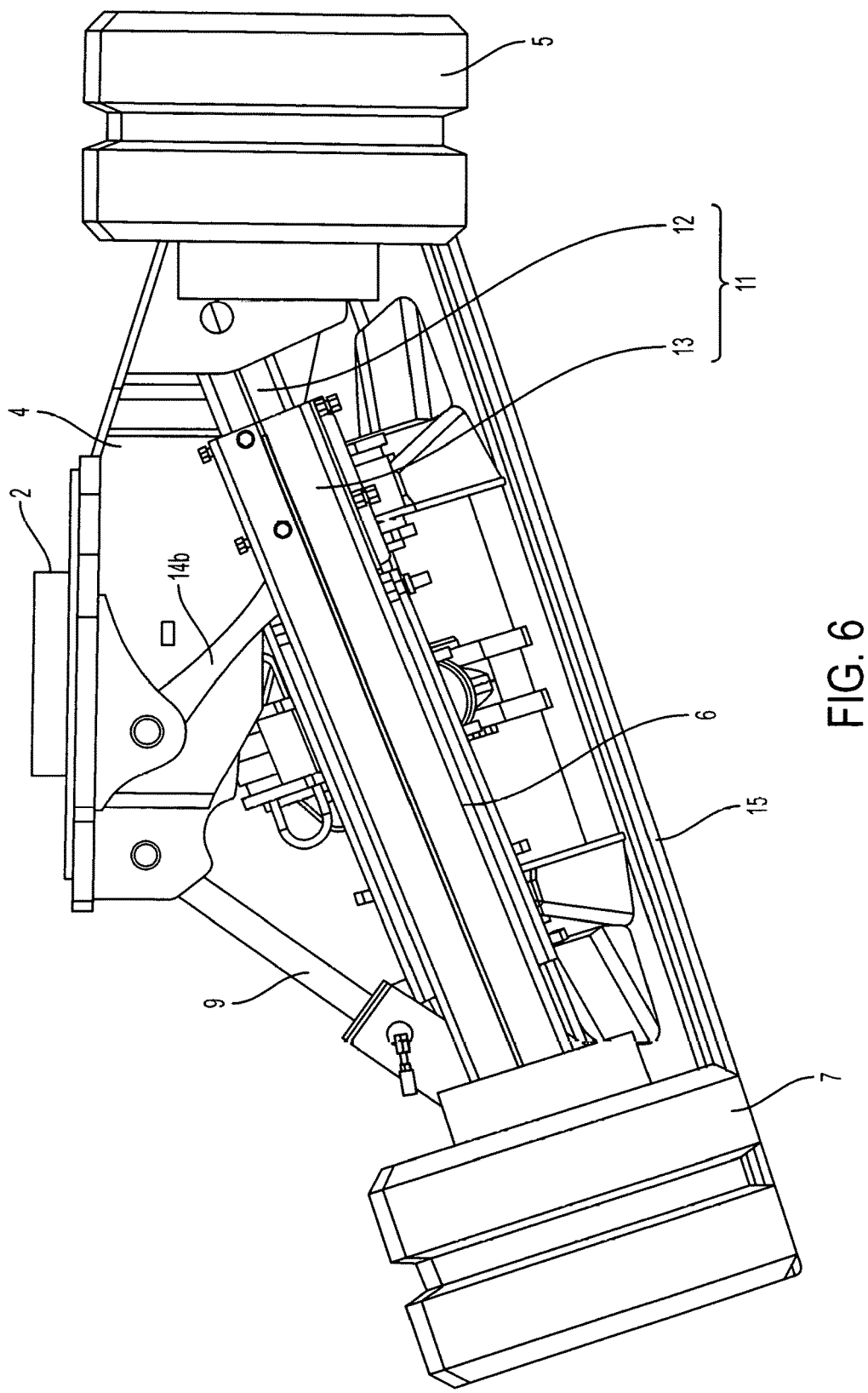
FIG. 6 shows a rear view of the construction vehicle from FIG. 5.

In this case, FIGS. 3 and 4 show in particular the substructure in a horizontal position, while FIGS. 5 6 show the substructure in a pivoted position, that is to say with, the lower chassis 6 pivoted downward.

In the embodiment shown, two coupling rods 14, namely a front coupling rod 14a (FIG. 5) and a rear coupling rod 14b (FIG. 6), are provided.

Fastened to the front part of the lower chassis 6 is a dozer blade 15. As is discernible in particular from FIGS. 5 and 6, the dozer blade 15 pivots together with the lower chassis 6 and thus adapts readily to the inclined underlying surface 10.

The lower chassis 6 has the telescoping device 11. In particular, to this end, connecting struts (struts 12, 13) are provided in front of and behind the slewing ring 2 as seen in the direction of travel, said connecting struts having a length-changing capability. The connecting struts are connected together by a strut interconnection 16 extending in the direction of travel, in order to increase the stability of the lower chassis 6. Furthermore, the strut interconnection 16 represents a stop which corresponds to a stop 17 on the upper chassis 4. When the leaver chassis 6 is in the horizontal position (FIG. 3), the stop 17 bears on the strut interconnection 16, such that the horizontal position is additionally stabilized in a form-fitting manner for normal excavator operation.

The dozer blade 15 is fastened to the lower strut 13.

Figure 7:
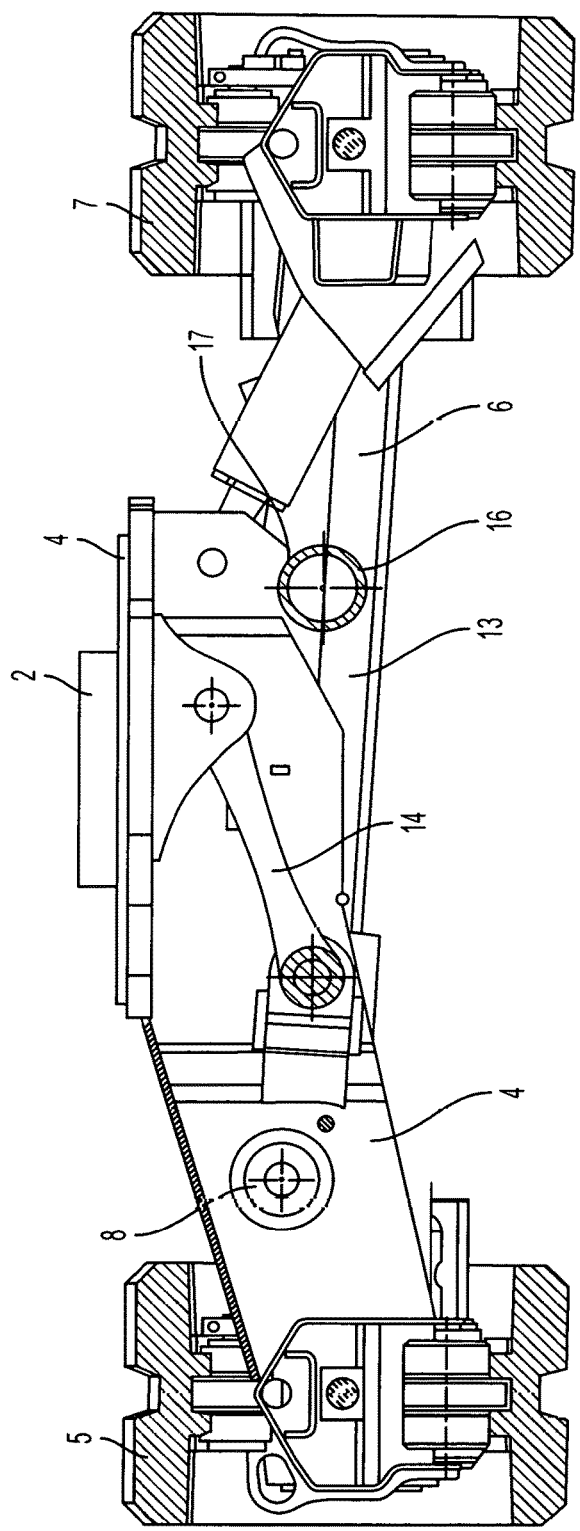
FIG. 7 shows a section through the lower part of a construction vehicle.

FIG. 7 shows the action of the stop 17 in a sectional illustration. It is clearly apparent that the partially circular stop 17 fits closely around the tubular strut interconnection 16 in order to ensure a sufficient form fit.

The connecting struts, that is to say the upper strut 12 and the lower strut 13, are also suitable for guiding hose lines and pipelines in a protected manner, for example the supply lines for the drive motor for the lower propulsion device 7.

Figure 8:
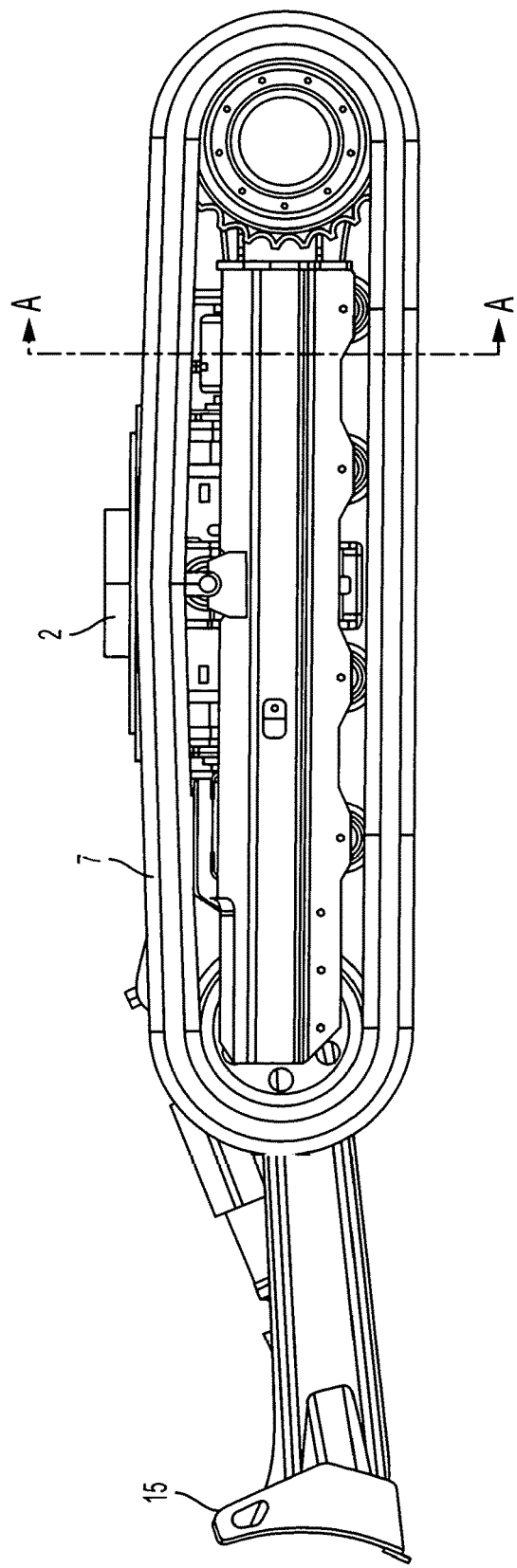
FIG. 8 shows a side view of the lower part of a construction vehicle.
Figure 9:
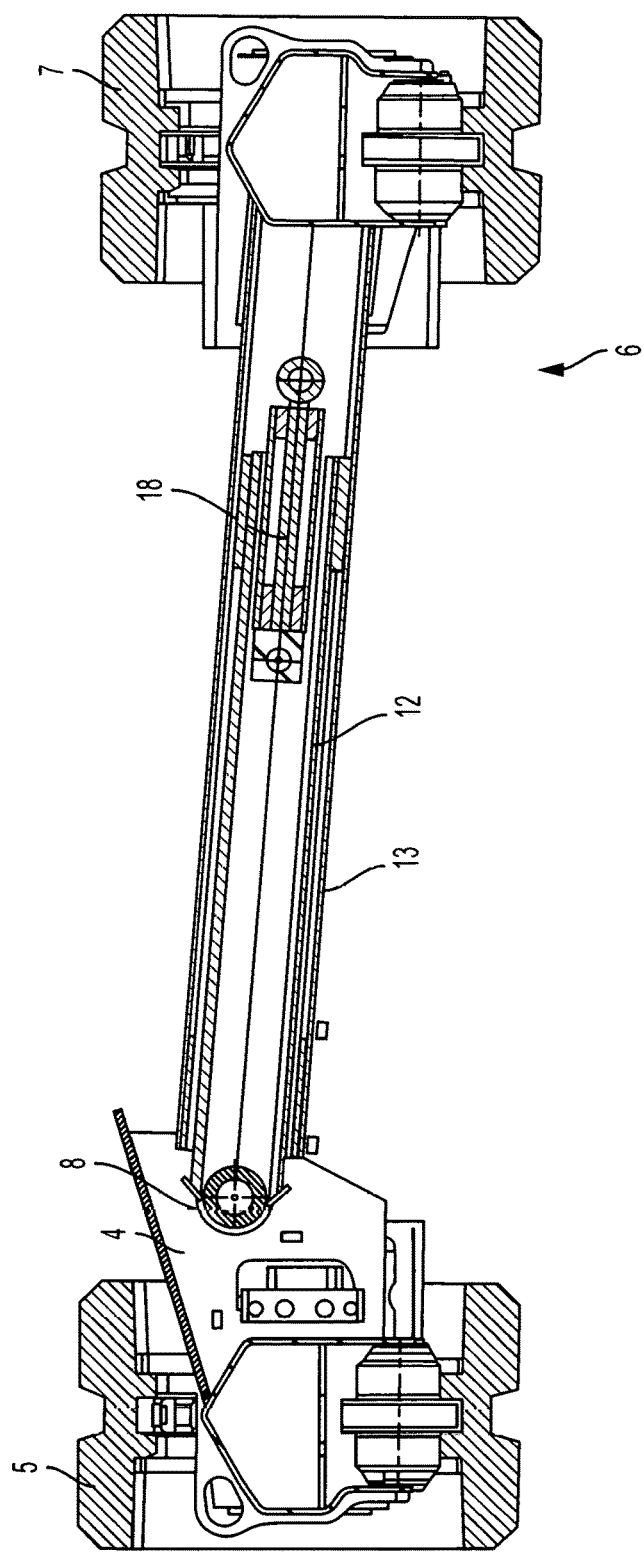
FIG. 9 shows a section along the line A-A in FIG. 8.

FIGS. 8 and 9 show a variant of the telescoping device 11, wherein FIG. 9 illustrates a section along the line A-A in FIG. 8.

Accordingly, a telescope actuating device 18 is provided inside the struts 12, 13 that are guided one inside the other. In the present case, the telescope actuating device 18 is a piston-cylinder unit which is operated hydraulically. Alternatively, some other linear adjustment means, for example an electrical actuator or the like would also be possible.

With the aid of the telescope actuating device, which likewise belongs to the telescoping device 11, it is possible to displace the lower strut 13 linearly relative to the upper strut 12. In this way, the distance between the lower propulsion device 7 and the pivot axle 8 and thus the distance between the two propulsion device 5, 7 can be changed independently of the pivoted position of the lower chassis 6. While, in the embodiment in FIG. 2, the linear displacement of the lower strut 13 relative to the upper strut 12 depends on the angular position of the lower chassis 6 on account of the coupling action of the coupling rod 14, in the embodiment in FIGS. 8 and 9, an angular position is not necessary. Rather, the distance between the two propulsion device 5, 7 can be set as desired in accordance with the requirements of the driver even in the horizontal position, that is to say in the nonpivoted position of the lower chassis 6.

In order to actuate the respective actuating devices, and thus in particular to pivot the lower chassis 6 and to set the telescoping device 11, suitable operating elements can be provided, via which the driver can specify his requirements.

The invention claimed is:

1. A construction vehicle having:
   a slewing ring on which a superstructure is rotatably mounted; and
   an undercarriage supporting the slewing ring; wherein
   the undercarriage has an upper chassis having an upper propulsion device that is rigidly connected to the slewing ring;
   the undercarriage has a lower chassis that has an upper end that is located beneath an upper end of the upper chassis when the vehicle is supported on level ground, the lower chassis having a lower propulsion device that is mounted in a pivotable manner with respect to the upper chassis; and wherein
   a pivoting apparatus is provided in order to pivot the lower chassis relative to the upper chassis.

2. The construction vehicle as claimed in claim 1, wherein
   at least one horizontally extending pivot axle, about which the lower chassis is pivotable relative to the upper chassis, is formed between the upper end of the upper chassis and the upper end of the lower chassis; and wherein
   the pivoting apparatus has at least one of a hydraulic actuating device and an electrical actuating device.

3. The construction vehicle as claimed in claim 1, wherein a dozer blade is fastened to the lower chassis.

4. The construction vehicle as claimed in claim 1, wherein the lower propulsion device is movable linearly relative to the pivot axle.

5. The construction vehicle as claimed in claim 1, wherein
   the lower chassis has a telescoping device; and wherein
   the telescoping device is configured to change a distance between the lower propulsion device and the pivot axle.

6. The construction vehicle as claimed in claim 5, wherein a coupling device is provided between the upper chassis and the lower chassis in order to automatically change the distance between the lower propulsion device and the pivot axle when the lower chassis is pivoted relative to the upper chassis.

7. The construction vehicle as claimed in claim 6, wherein the coupling device has a coupling rod, one end of which is pivotably fastened to the upper chassis and the other end of which is pivotably fastened to the lower chassis.

8. The construction vehicle as claimed in claim 7, wherein
   the telescoping device has 1) an upper telescopic element that is coupled to the pivot axle and that is pivotable about the pivot axle, and 2) a lower telescopic element that is coupled rigidly to the lower propulsion device; and wherein the upper and lower telescopic elements are guided one inside the other and are movable linearly relative to one another.

9. The construction vehicle as claimed in claim 8, wherein the other end of the coupling rod is pivotably fastened to the lower telescopic element.

10. The construction vehicle as claimed in claim 8, wherein the telescoping device has a telescope actuating device for changing the relative position of the two telescopic elements with respect to one another.

11. The construction vehicle as claimed in claim 10, wherein the telescope actuating device is arranged inside at least one of the telescopic elements.

12. The construction vehicle as claimed in claim 1, wherein a stop is provided between the lower chassis and the upper chassis in order to define a horizontal operating state in which the chassis takes up a relative position in which the propulsion devices are in a common horizontal plane.

13. The construction vehicle as claimed in claim 1, further comprising a driver's cab that is mounted on the superstructure and that is configured to support a driver of the construction vehicle.

14. The construction vehicle as claimed in claim 1, further comprising a tool manipulator that is provided on the superstructure and to which is mounted at least one of a bucket and a chisel.

15. The construction vehicle as claimed in claim 1, wherein the pivoting apparatus comprises a pivot axle pivotally coupling the upper end of the lower chassis to the upper chassis and an actuating device that has a first end pivotally connected to the upper chassis above the pivot axle and a second end pivotally connected to the lower chassis below the pivot axle, wherein the actuating device comprises one of a hydraulic actuating device and an electrical actuating device.

16. The construction vehicle as claimed in claim 1, wherein
the upper end of the upper chassis is located on a first side of a lateral bisector of the construction vehicle and the lower end of the upper chassis is located on a second side of the lateral bisector opposite the first side, and wherein
the upper end of the lower chassis is located on the second side of the lateral bisector and the lower end of the lower chassis is located on the first side of the lateral bisector.

17. An excavator having:
a superstructure;
a slewing ring on which the superstructure is rotatably mounted;
a driver's cab that is mounted on the superstructure and that is configured to support a driver of the excavator;
a tool manipulator that is provided on the superstructure and to which is mounted a tool comprising at least one of a bucket and a chisel; and
an undercarriage supporting the slewing ring of the excavator; wherein
the undercarriage has an upper chassis having an upper propulsion device that is rigidly connected to the slewing ring;
the undercarriage has a lower chassis on which the upper chassis is supported and which has an upper end that is located under an upper end of the upper chassis when the vehicle is supported on level ground, the lower chassis having a lower propulsion device; and wherein
at least one pivot axle pivotally connects the upper end of the lower chassis to the upper chassis and permits the entire lower chassis to pivot relative to the entire upper chassis.

18. The excavator as claimed in claim 17, further comprising an actuating device that drives the upper chassis to pivot about the at least one pivot axle relative to the lower chassis, wherein the actuating device comprises one of a hydraulic actuating device and an electrical actuating device.

19. The excavator as claimed in claim 18, wherein the actuating device has a first end pivotally connected to the upper chassis above the pivot axle and a second end pivotally connected to the lower chassis below the pivot axle.

20. The excavator as claimed in claim 18, wherein
the upper end of the upper chassis is located on a first side of a lateral bisector of the excavator and the lower end of the upper chassis is located on a second side of the lateral bisector opposite the first side, and wherein
the upper end of the lower chassis is located on the second side of the lateral bisector and the lower end of the lower chassis is located on the first side of the lateral bisector.

* * * * *